(12) United States Patent
Yoshikawa et al.

(10) Patent No.: US 8,312,501 B2
(45) Date of Patent: Nov. 13, 2012

(54) MOBILE TERMINAL

(75) Inventors: Hisashi Yoshikawa, Tokyo (JP); Masahito Sato, Komae (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 691 days.

(21) Appl. No.: 12/002,892

(22) Filed: Dec. 19, 2007

(65) Prior Publication Data

US 2009/0077603 A1 Mar. 19, 2009

(30) Foreign Application Priority Data

Sep. 18, 2007 (JP) ................................ 2007-241512

(51) Int. Cl.
- H04N 7/173 (2006.01)
- H04N 7/16 (2006.01)
- G06F 15/16 (2006.01)

(52) U.S. Cl. .......... 725/134; 725/62; 725/110; 725/118; 725/153; 709/206

(58) Field of Classification Search .................... 725/45, 725/46, 62, 110, 118, 134, 142, 153; 455/403, 455/3.01; 709/206

See application file for complete search history.

(56) References Cited

U.S. PATENT DOCUMENTS

| | | | | |
|---|---|---|---|---|
| 6,061,056 A * | 5/2000 | Menard et al. | ................. | 715/704 |
| 6,754,904 B1 * | 6/2004 | Cooper et al. | .................. | 725/32 |
| 7,143,356 B1 * | 11/2006 | Shafrir et al. | ................. | 715/751 |
| 7,249,182 B1 * | 7/2007 | Heinonen et al. | ............. | 709/227 |
| 7,603,683 B2 * | 10/2009 | Reto | ................ | 725/34 |
| 7,636,544 B2 * | 12/2009 | Yamada et al. | ............. | 455/3.01 |
| 7,697,939 B2 * | 4/2010 | Wada et al. | ................. | 455/452.2 |
| 7,706,741 B2 * | 4/2010 | Patel et al. | .................... | 455/3.05 |
| 7,954,124 B2 * | 5/2011 | Rambo | .......................... | 725/43 |
| 7,979,055 B2 * | 7/2011 | Watanabe et al. | .......... | 455/412.1 |
| 7,985,134 B2 * | 7/2011 | Ellis | ................................ | 463/25 |
| 8,140,633 B2 * | 3/2012 | Daniell et al. | ................ | 709/206 |
| 8,156,521 B2 * | 4/2012 | Ikeguchi et al. | ................ | 725/37 |
| 2001/0013130 A1 * | 8/2001 | Shimizu et al. | ................. | 725/91 |
| 2003/0088687 A1 * | 5/2003 | Begeja et al. | ................. | 709/231 |
| 2004/0243671 A9 * | 12/2004 | Needham et al. | ............. | 709/204 |
| 2005/0015801 A1 * | 1/2005 | Hososda et al. | ................ | 725/38 |
| 2005/0204379 A1 * | 9/2005 | Yamamori | ....................... | 725/15 |
| 2006/0053047 A1 * | 3/2006 | Garcia et al. | ..................... | 705/14 |
| 2006/0156373 A1 * | 7/2006 | Hasegawa et al. | ............ | 725/135 |
| 2006/0190966 A1 * | 8/2006 | McKissick et al. | ............. | 725/61 |
| 2007/0150921 A1 * | 6/2007 | Mueller et al. | ................... | 725/62 |
| 2007/0169167 A1 * | 7/2007 | Morimura et al. | ................ | 726/1 |
| 2008/0016169 A1 * | 1/2008 | Kaghazian | .................... | 709/206 |
| 2008/0288322 A1 * | 11/2008 | Kennedy et al. | .................. | 705/9 |
| 2009/0077179 A1 * | 3/2009 | Bi et al. | ......................... | 709/206 |
| 2010/0192179 A1 * | 7/2010 | Ellis et al. | ........................ | 725/40 |

FOREIGN PATENT DOCUMENTS

JP 2005151093 A * 6/2005

* cited by examiner

*Primary Examiner* — Pinkal R Chokshi

(74) *Attorney, Agent, or Firm* — Maschoff Gilmore & Israelsen

(57) ABSTRACT

A mobile terminal pre-stores address information of other terminals to be notification destinations of program information related to a television broadcast. During reception and display of the television broadcast, when a notification request for the program information related to the television broadcast being received is input, the mobile terminal generates notification data including the program information relating to the television broadcast while maintaining the reception and the display processing of the television broadcast, reads the address information of other terminals to be the notification destinations from the storage unit to transmit the generated notification data to other terminals on the basis of the read address information.

15 Claims, 5 Drawing Sheets

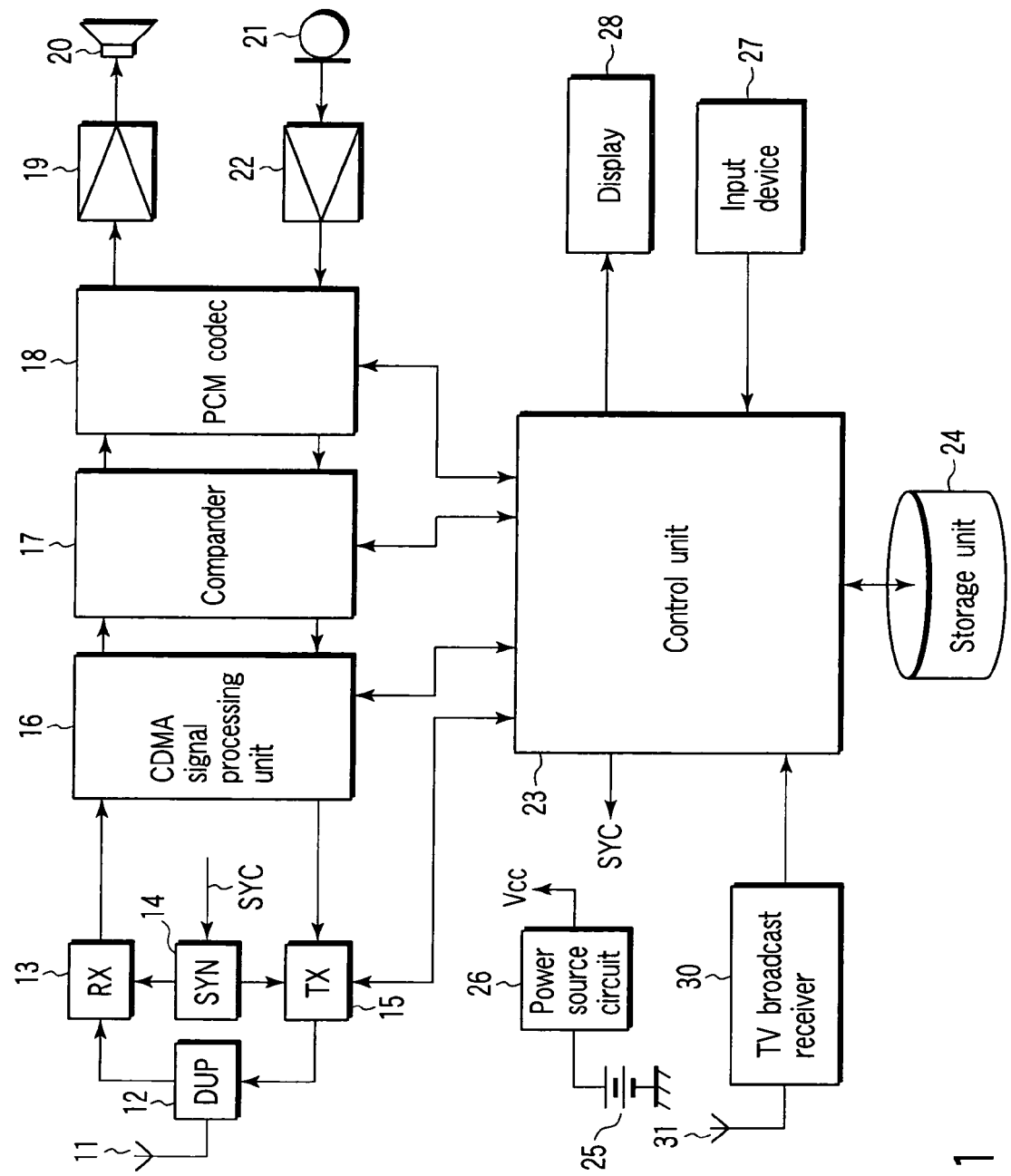
F I G. 1

Second storage area (TV program information notification destination)

| Telephone number | Mail address | Name | Group | Keyword | Presence information | Priority |
|---|---|---|---|---|---|---|
| XXX-YYYY | XXX@YYY.com | AAA | G1 | Sports | P1 | High |
| ZZZ-VWXY | ZZZ@VWX.com | BBB | G2 | Drama entertainment | P2 | Low |
| ⋮ | ⋮ | ⋮ | ⋮ | ⋮ | ⋮ | ⋮ |

FIG. 4

Presence information P1

| Conditions | Right and wrong |
|---|---|
| In meeting | × |
| In viewing | ○ |
| Outside of communication area | × |
| In roaming | ○ |
| Time zone (night) | ○ |
| In speech | × |

FIG. 5A

Presence information P2

| Conditions | Right and wrong |
|---|---|
| In meeting | × |
| In viewing | ○ |
| Outside of communication area | × |
| In roaming | × |
| Time zone (night) | × |
| In speech | × |

FIG. 5B

MOBILE TERMINAL

CROSS-REFERENCE TO RELATED APPLICATIONS

This application is based upon and claims the benefit of priority from prior Japanese Patent Application No. 2007-241512, filed Sep. 18, 2007, the entire contents of which are incorporated herein by reference.

BACKGROUND OF THE INVENTION

1. Field of the Invention

The present invention relates to a mobile terminal provided with a television broadcast receiving function.

2. Description of the Related Art

In recent years, as regards mobile terminals such as cellular phones and personal digital assistants (PDAs), terminals with reception functions of television broadcasting such as one-segment terrestrial digital broadcasting (hereinafter referred to as one-segment broadcasting) have become widely used. Using these types of mobile terminals allow users to view television broadcasts anytime and anywhere in a broadcasting service area and bring the users convenience.

By the way, recently, it has been proposed to notify program information of a television broadcast being viewed to other users, so as to allow a plurality of users to view the same television broadcast and so share content. For instance, a technique is proposed, in which area channel information is generated and stored by associating identification (ID) of a base station with a frequency of a television broadcast signal which can be received when the mobile terminals belong to the base station, and the area-channel information is transmitted to other terminals by means of e-mails via a mobile communication network (e.g., Jpn. Pat. Appln. KOKAI Publication No. 2005-151093).

However, in such mobile terminals proposed conventionally, for transmitting the area-channel information to other terminals, it is needed for the users to stop once display operations of the television broadcast being viewed to start mailers for transmitting e-mails, and to generate and transmit e-mails as usual. Therefore, the users have to interrupt the viewing of the television broadcast during generation and transmission of the e-mails, or have to decrease in size of viewing screens then the users may miss desired scenes of the television broadcast or may fail to acquire important information sometimes during interruption or decreasing. Thus, this problem has been forced to take prompt measures.

BRIEF SUMMARY OF THE INVENTION

An object of the present invention is to provide a mobile terminal configured to notify program information of a television broadcast to other terminals without obstructing a viewing operation of the television broadcast.

According to an aspect of the invention, there is provided a mobile terminal with a function of making information communication via a radio communication network and a function of reception and display of a television broadcast, and stores in advance at least address information of other terminals to be notification destinations of program information of the television broadcast in a storage unit. During the reception and the display of the television broadcast, when a request for notifying the program information relating to the television broadcast being viewed is input, the mobile terminal generates notification data including the program information relating to the television broadcast, also reads the address information of other terminals to be the notification destinations from the storage unit, and transmits the generated notification data based on the read address information to other terminals while maintaining the reception and the display of the television broadcast.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram depicting a configuration of a mobile terminal in an embodiment of the present invention;

FIG. 4 is a view depicting a preferred example of information stored in a storage area of television program information notification destinations to be disposed in the storage unit;

FIGS. 5A, 5B are views each depicting preferred examples of presence information to be stored in the storage area.

DETAILED DESCRIPTION OF THE INVENTION

Figure 2:
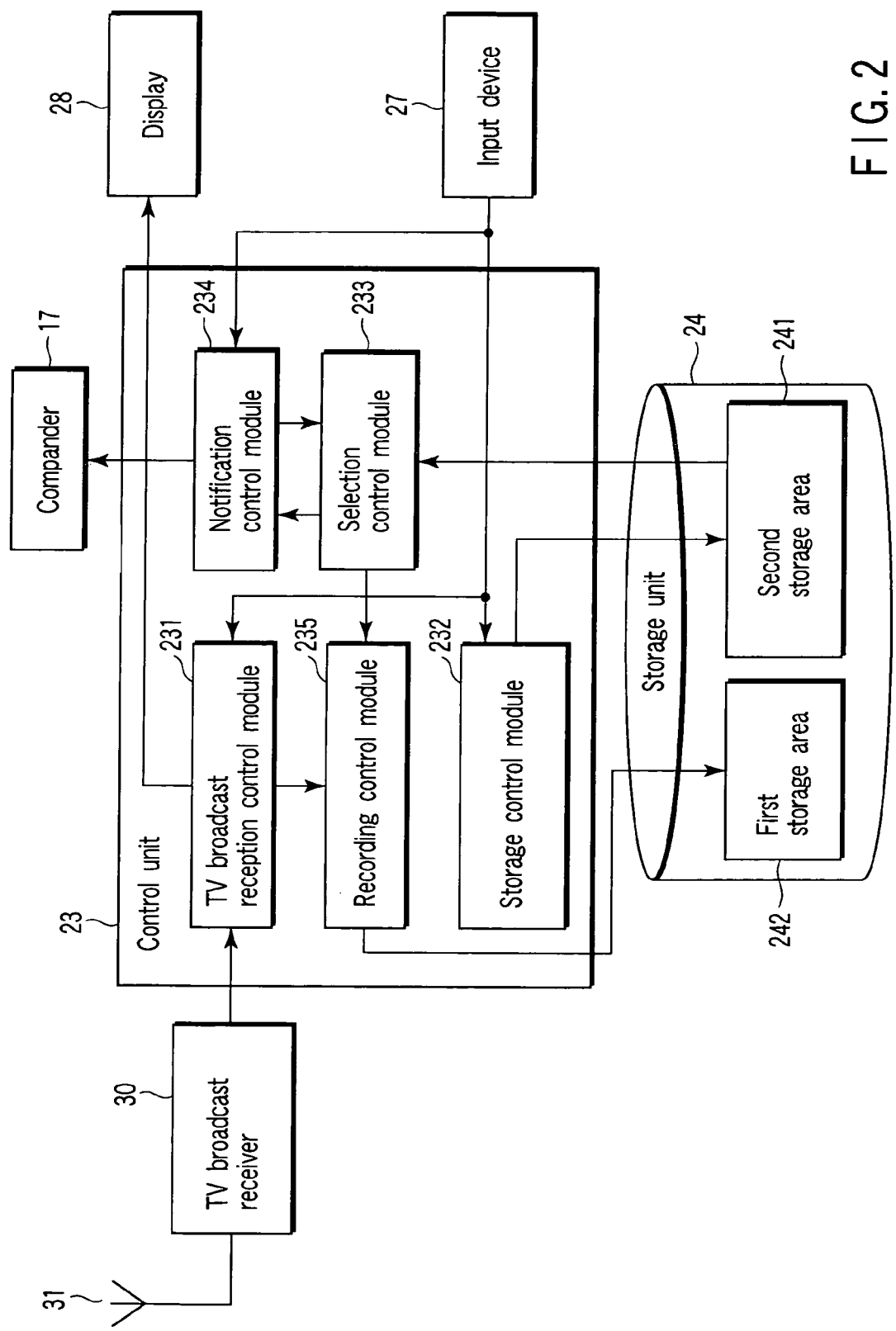
FIG. 2 is a block diagram depicting a functional configuration of a control unit and a storage unit that is a principal part of the mobile terminal depicted in FIG. 1.

The following will describe embodiments of the present invention by referring to the drawings.

FIG. 1 illustrates a block diagram depicting a configuration of a mobile terminal regarding an embodiment of the invention.

A radio signal transmitted from a base station (not shown) is received by an antenna 11 then input in a reception circuit (RX) 13 via an antenna duplexer (DUP) 12. The RX 13 mixes the received radio signal with a local oscillation signal output from a frequency synthesizer (SYN) 14 to frequency-convert (down convert) into an intermediate frequency signal. The RX 13 applies orthogonal demodulation to the down-converted intermediate frequency signal to output a reception baseband signal. A control signal SYC output from a control unit 23 instructs the frequency of the local oscillation signal generated from the SYN 14.

The reception baseband signal is input to a CDMA signal processing unit 16. The processing unit 16 includes a RAKE receiver. The RAKE receiver applies a despreading process on a plurality of paths, which is included in the baseband signal, with a spread code, respectively. The phase of the despreading-processed signal of each path is synthesized. Thus, reception packets of a prescribed transmission format are obtained. The packets are input to a compress/expand processing unit (hereinafter referred to as a compander) 17.

A multiplexer/demultiplexer of the compander 17 separates the packet data output from the processing unit 16 into each medium such as audio data and video data. The compander 17 then applies decoding processing to the data for each separated medium, respectively. For instance, in a speech mode, a speech codec of the compander 17 decodes coded audio data such as voice data included in the reception packet to output a digital audio signal. Like a video telephone mode, if the packet includes video data, the video codec of the compander 17 decodes the video data to output a digital video signal.

The digital audio signal obtained from the foregoing decoding processing is input in PCM code processing unit (hereinafter referred to as PCM codec) 18. The PCM code 18 applies PCM decode to the input digital audio signal to output an analog audio signal. The analog audio signal is amplified by a reception speech amplifier 19 and then output from a loudspeaker 20 as sound.

The digital video signal decoded by the video codec of the compander 17 is input in a control unit 23. The control unit 23 displays the digital video signal input from the compander 17 on a display 28 through a video RAM. The control unit 23 displays not only a received video data but also a video signal and a still image captured by a camera (not shown) through the video RAM.

If the reception packets contain e-mail or data downloaded from a Web site, the packets are input in the control unit 23 from the CDMA signal processing unit 16. The control unit 23 stores the input packets in a reception signal storage area (not shown) in a storage unit 24 and also reads the packets from the storage area in response to a display operation by a user through an input device 27 to display it on the display 28.

Meanwhile, in the speech mode, a voice signal of the user input in a microphone 21 is amplified up to an appropriate level by a transmission speech amplifier 22, applied PCM coding processing by the PCM codec 18 to be a digital audio signal and then input in the compander 17 from the control unit 23. The e-mails generated from the control unit 23 are also input in the compander 17 from the control unit 23.

The compander 17 detects an energy quantity of input voice from the digital audio signal output from the PCM codec 18, and decides a transmission data rate on the basis of the detection result. The audio codec of the compander 17 encodes the digital audio signal into a signal in a format depending on the data rate then generates audio data. The video codec of the compander 17 encodes the digital video signal output from the control unit 23 to generate video data. Furthermore, when the control unit 23 outputs e-mail, the compander 17 encodes its text data etc. The multiplexer/demultiplexer of the compander 17 packetizes the encoded audio data, video data, text data, etc. in accordance with a prescribed transmission format, and the compander 17 outputs a plurality of packets to the CDMA signal processing unit 16.

The processing unit 16 applies spectrum spreading processing on the packets output from the compander 17 by using a spread code assigned to a transmission channel then outputs its output signal to a transmission circuit (TX) 15. The TX 15 modulates the signal to which the spectrum spreading processing is applied by using a digital modulation system such as a quadrature phase shift keying (QPSK) system. The TX 15 synthesizes the transmission signal generated from this demodulation with the local oscillation signal generated from the SYN 14 to frequency-convert it into a radio signal. The TX 15 then applies high-frequency-amplification on the radio signal so as to be a transmission power level to be instructed from the control unit 23. The amplified radio signal is supplied to the antenna 11 though the antenna duplexer 12 to be transmitted to the base station.

The mobile terminal according to the embodiment includes a television broadcast receiver (TV broadcast receiver) 30. The receiver 30 receives, for example, one-segment terrestrial digital broadcasting via the antenna 31, and inputs reception signal of the received one-segment broadcast to the control unit 23. The control unit 23 separates the input reception signal of the one-segment broadcast into a moving image stream and an audio stream then each decodes them to display the decoded moving image signal on the display 28. The control unit 23 also supplies the decoded digital audio signal to the PCM codec 18. After converted into the analog audio signal by the PCM codec 18, the digital audio signal is output from the loudspeaker 20 through the reception speech amplifier 19.

A power source circuit 26 generates a prescribed operation power source voltage Vcc on the basis of an output from a rechargeable battery 25 to supply the Vcc to each circuit unit. The battery 25 is charged from a charging circuit (not shown). The input device 27 is composed of a dial key pad and a variety of function keys.

The storage unit 24 uses, for example, an EEPROM or a hard disk as a storage medium, and includes the following storage areas needed to achieve this invention in addition to the area for storing a phonebook including telephone numbers, names, and mail addresses, call history data including an outgoing/incoming call history, and the reception signal such as e-mails, and so on. FIG. 2 depicts the functional configuration of the mobile terminal.

The storage unit 24 includes a second storage area 241 and a first storage area 242. The first storage area 242 is used for recording reception signal of the television broadcast. The second storage area 241 is used for storing information about at least one person to be notified of the program information such as channel information and airtime of the television broadcast being viewed.

The information on the person includes, for example, telephone numbers, mail addresses, names, group names, keywords, presence information and priorities, as shown in FIG. 4. Among of them, the keywords show categories of the television broadcast programs, for example, 'news', 'sports', 'songs', 'entertainment'. The presence information sets information showing operation states of other terminals to be the notification destinations and showing priorities of notification into schedules of the users of the corresponding terminals.

As for the operation states of the terminals, 'outside the range', 'in roaming' 'in television viewing' 'in speech', etc., are set, and as for the schedule of the user, 'in meeting', 'in viewing', 'time band (e.g., night time) are set. FIGS. 5A, 5B each illustrate examples of the setting results of the presence information. The second storage area 241 may be stored in storage unit 24 as one item of the phonebook.

The control unit 23 includes, for example, a central processing unit (CPU), and includes, as functions regarding the invention, a television broadcast reception control module 231, a storage control module 232, a selection control module 233, a notification control module 234, and a recording control module 235. These control functions are each realized by making the CPU execute application programs.

When the user conducts a television viewing operation from the input device 27, the control module 231 activates the receiver 30. The control module 231 decodes the video stream included in the broadcast data received by the receiver 30 to display video data on the display 28, and also decodes the audio stream then outputs audio signal from the loudspeaker 20 through the PCM codec 18.

The storage control module 232 stores the information about at least one person to be notified of the program information of the television broadcast in the second storage area 241 into the storage unit 24 in response to the user's operation through the input device 27. The information to be stored includes, for example, the telephone numbers, mail addresses, user names, keywords, presence information and priorities of other terminals, as shown in FIG. 4.

When the notification request for the television program information being viewed is input from the input device 27, the selection control module 233 firstly selects the person to be candidate of the notification destination on the basis of the keywords stored in the second storage area 241 in the storage unit 24. Next, the selection control module 233 determines whether or not the selected person to be the candidate of the notification destination satisfies notification conditions on the basis of its presence information. The selection control unit 233 then selects the person satisfying the notification conditions as the notification destination person, and reads his/her mail address from the second storage area 241 in the storage unit 24.

When the notification request for the television program information being viewed is input through the input device 27, the notification control module 234 creates an e-mail including the program information of the television broadcast being viewed while maintaining the reception and display processing of the television broadcast by the control module 231. That is, the creation of the e-mail is background processing. The control module 234 transmits the created e-mail to the terminal owned by the foregoing other person on the basis of the mail address read from the second storage area 241 in the storage unit 24.

If the selection control module 233 determines that the notification conditions of the person to be the candidate of the notification destination is not satisfied, and also the priority is set to 'High' to the corresponding-person, the recording control module 235 stores the reception signal of the television broadcast being viewed in the first storage area 242 in the storage unit 24.

Figure 3:
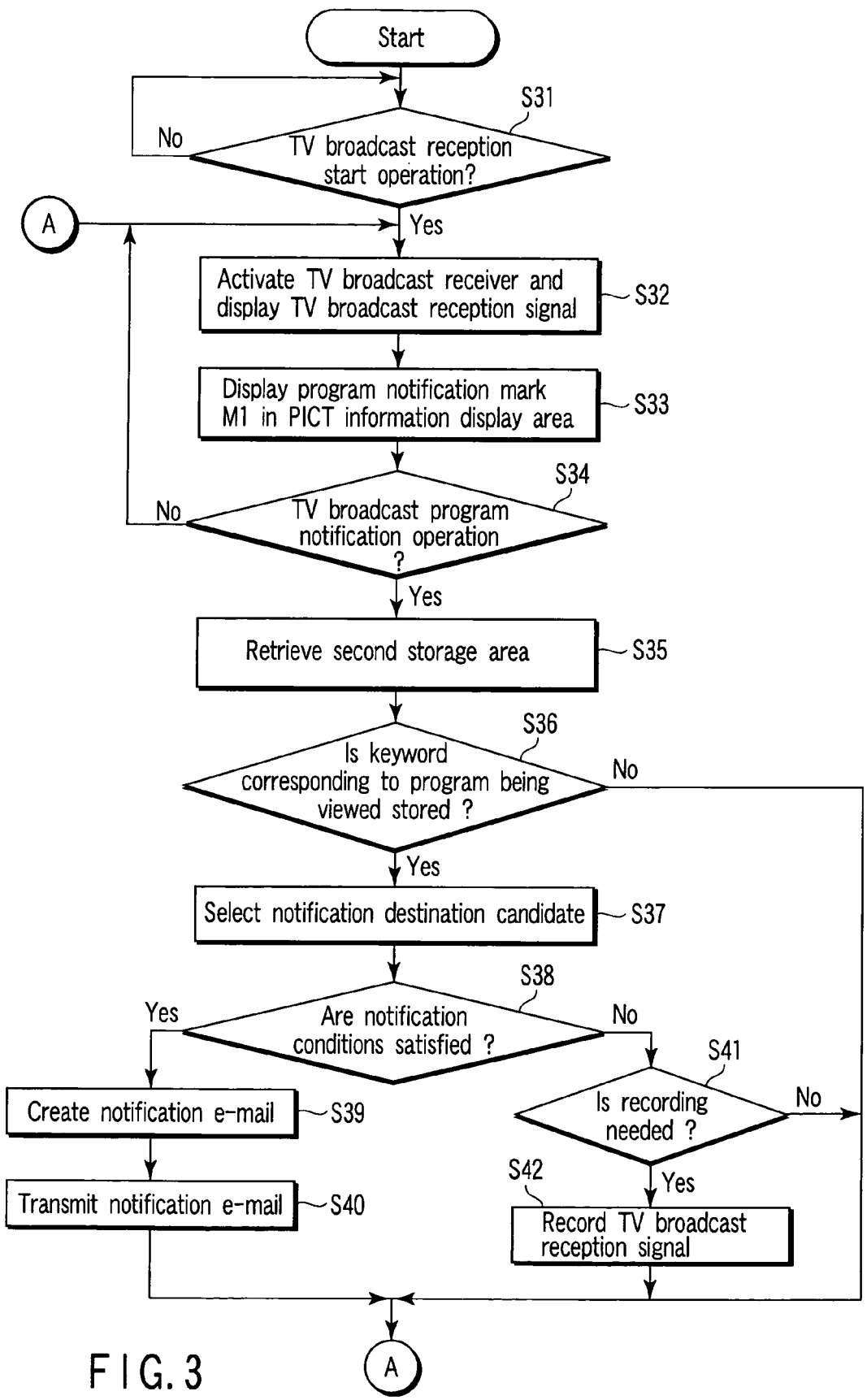
FIG. 3 is a flowchart depicting a control procedure and control contents by the control unit shown in FIG. 2.

The following will describe operations of the device configured as mentioned above. FIG. 3 illustrates a flowchart depicting the control procedure and the control content by the control unit 23.

Figure 6:
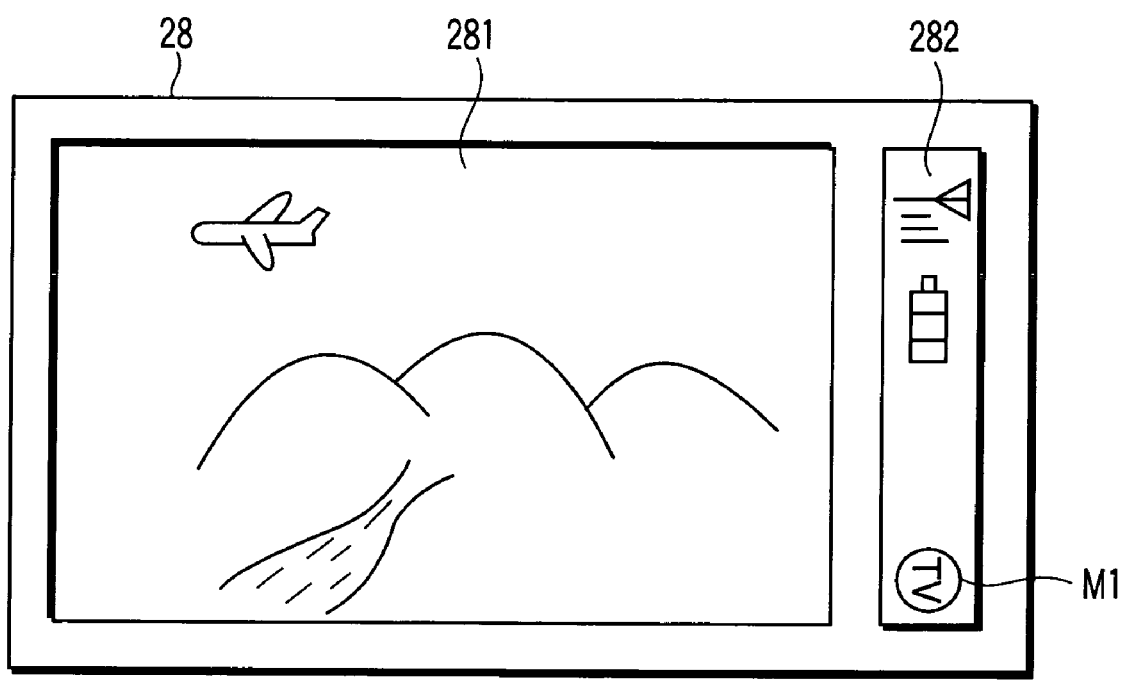
FIG. 6 is a view depicting a preferred example of a television broadcast image to be displayed on a display and linformation to be displayed in a PICT area of the mobile terminal shown in FIG. 1.

In a waiting state, the control unit 23 monitors a television broadcast receiving operation as well as an outgoing call operation, a usual e-mail transmitting operation, etc., in Step S31. In this state, when the user conducts the television broadcast receiving operation by the input device 27, the control unit 23 activates the receiver 30 in Step S32. The TV broadcast reception control module 231 in control unit 23 firstly decodes the video stream included in the television broadcast data received by the receiver 30 for each medium. The TV broadcast reception control module 231 in control unit 23 then displays the decoded video data on a television broadcast display area 281 of the display 28, as shown in FIG. 6. The control unit 23 also decodes the audio stream then outputs the audio signal via the loudspeaker 20 through the PCM codec 18. Thus, after this, the mobile terminal brings about a television broadcast reception and display operation mode, and the person of the mobile terminal user may view the television broadcast. The reception and display operation mode is maintained until the user performs a television reception terminating operation by the input device 27.

As shown in FIG. 6, during the reception and display of the television broadcast, the control unit 23 displays a program notification mark M1 on a PICT information display area 282 of the display 28 in addition to a mark indicating a reception electric field strength and a battery remaining amount. The mark M1 is displayed near a corresponding software key on the input device 27 and showing the software key having a function to execute notification of the program information of the television broadcast being viewed to other persons.

Now, it is assumed that, during the reception and the display of the television broadcast, the user operates the software key of the input device 27 corresponding to the mark M1 in order to notify the television broadcast being viewed to other persons. The control unit 23 then detects this user's operation in Step S34 and then the selection control module 233 in control unit 23 carries out notification destination selection processing and notification control processing in the following manner.

At first, the selection module 233 in control unit 23 extracts the category of the television broadcast being viewed in Step S35, and determines whether or not the keyword corresponding to the extracted category has been stored in the second storage area 241 in the storage unit 24 in Step S36. Incidentally, the category may be recognized by comparing EPG (Electronic Program Guide) data and channel of the television broadcast being viewed. If the keyword corresponding to the category of the television broadcast program being viewed has not been stored in the second storage area 241 as the determination result, the selection control module 233 in control unit 23 determines that the notification destination of the program information does not exist and returns to the reception and the display processing of the television broadcast in Step S32.

In contrast, it is assumed that the keyword corresponding to the category of the television broadcast program during reception has been stored in the second storage area 241 in the storage unit 24. In this case, the selection control module 233 in control unit 23 selects a person who has preliminarily registered the keyword corresponding to the category of the television broadcast program being received as a candidate of a notification destination in Step S37. For instance, if the category of the television broadcast program being received is 'sports', the selection control module 233 in control unit 23 selects a person 'AAA' depicted in FIG. 4 as the candidate of the notification destination.

Next, the selection control module 233 in control unit 23 reads the presence information registered in advance in relationship to the user selected as the foregoing notification destination candidate from the second storage area 241 in the storage unit 24 in Step S38. The selection control module 233 in control unit 23 then determines whether or not the person and his/her terminal selected as the candidate of the notification destination satisfy the notification conditions.

For instance, the selection control module 233 in control unit 23 refers to the schedule (not shown) of the person 'AAA' which has been stored in the second storage area 241 in advance to determine whether or not the person 'AAA' is now 'in meeting' at a current time. If the person is 'in meeting', since the presence information P1 depicted in FIG. 5A is set to a mark of 'X', the selection control module 233 in control unit 23 determines that the person 'AAA' and his/her terminal 'do not satisfy the notification conditions'. In contrast, if the person 'AAA' is not 'in meeting', it is determined that the person 'AAA' and his/her terminal 'satisfy the notification conditions'. Even if the current time is in the night, since the presence information P1 of the person 'AAA' is set to a 'circle mark' for the time zone (night), as shown in FIG. 5A, it is determines that the person and his/her terminal 'satisfy the notification conditions'. If the candidate is a person 'BBB', since his/her presence information P2 is set to the mark of 'X' for the time zone (night) as shown in FIG. 5B, the control unit 23 determines that the person 'BBB' 'dose not satisfy the notification conditions'.

The selection control module 233 in control unit 23 also reads the telephone number of the terminal of the person selected as the notification destination candidate from the second storage area 241 in the storage unit 24, and tentatively transmits the telephone number to the corresponding-terminal. The selection control module 233 in control unit 23 determines whether or not the operation sate of the corresponding-terminal of the notification destination candidate is outside the communication area, whether or not the corresponding-terminal is now busy if it is inside the communication area, or whether or not the corresponding-terminal is in a service area of another mobile communication network in accordance with roaming on the basis of the control signal indicating the operation state of the incoming call destination to be transmitted to the tentative transmission from a mobile communication network.

For instance, if the person 'AAA' that is the notification destination candidate is 'outside of communication area', since the presence information P1 sets the mark of 'X' for 'outside of communication area' as shown in FIG. 5A, the selection control module 233 in control unit 23 determines that the person 'AAA' 'does not satisfy the notification conditions'. If the person 'AAA' is 'in speech', it is determined that the person 'AAA' 'does not satisfy the notification conditions', and if the person 'AAA' is not 'in speech', it is determined that it 'satisfies the notification conditions'. Further, in the case of 'in roaming', since the presence information P1 sets a 'circle mark' to 'in roaming' as shown in FIG. 5A, the selection control module 233 in control unit 23 determines that the person 'AAA' 'satisfies the notification conditions'. In the case of the person 'BBB', since the presence information P2 sets the mark of 'X' to 'in roaming' as shown in FIG. 5B, the selection control module 233 in control unit 23 determines that the person 'BBB' 'does not satisfy the notification conditions'.

Then, the determination of the notification conditions for the person and his/her terminal of the notification destination candidate has been completed, and as the determination results, and it is assumed that any of schedule and the operation state of the terminal of the person that is the notification destination candidate 'satisfy the notification conditions'. In this case, the control unit 23 shifts to Step S39 to create, by the notification control module 234 in control unit 23, an e-mail for notification. The program information acquired from the television broadcast data being in reception is inserted or attached into or to the main body of the e-mail. The selection control module 233 in control unit 23 reads the mail address of the corresponding-terminal from the second storage area 241 in the storage unit 24 in Step S40, and uses the mail address as a destination address to transmit the created e-mail to the terminal.

If a plurality of persons of the notification destinations are selected, the selection control module 233 in control unit 23 performs a multi-address transmission of the identical e-mails to the terminals of the persons.

In contrast, it is assumed that it is determined that either the schedule of the person of the notification destination candidate or the operation state of its terminal 'does not satisfy the notification conditions'. In such a case, the selection control module 233 in control unit 23 shifts to Step S41, and there, reads out the information of the priority from the second storage area 241 to determine whether recording is necessary or not. As the determination result, for example, if the priority of 'High' is set like the person 'AAA', the selection control module 233 in control unit 23 determines the recording is needed and makes a shift to Step S42. The recording control module 235 in control unit 23 then stores the television broadcast data being received in the first storage area 242 in the storage unit 24. Conversely, if the priority of 'Low' is set like the person 'BBB', the selection control module 233 in control unit 23 determines that the recording is not needed, and returns to the reception and the display processing of the television broadcast in Step S32 directly.

As given above, in the embodiment of the invention, the mobile terminal stores the information relating to other persons to be the notification destinations of the program information on the television broadcast in the second storage area 241 in the storage unit 24 in advance. When the notification request for the program information relating to the television broadcast being received is input in the reception thereof, the notification control module 234 creates the e-mails including the program information related to the television broadcast to transmit the e-mails to other terminals on the basis of the mail addresses which have been stored in the second storage area 241 in the storage unit 24 while maintaining the reception and the display processing of the television broadcast.

Thus, when the user, by simply operating the software key, inputs the notification request for the program information on the television broadcast being viewed, the e-mails including the program information are automatically created and are transmitted to other terminals on the basis of the mail addresses pre-registered in the second storage area 241 while maintaining the reception and the display of the television broadcast.

Therefore, the user may notify the program information to other persons without interrupting the viewing of the television broadcast, thereby the mobile terminal needs not worry about missing the scene desired to be watched and missing important information.

The mobile terminal is configured to display the program notification mark M1 having a function of displaying a position of a software key inputting a notification request for the television program information being viewed in the PIC information display area 282 on the display 28 during the reception and display of the television broadcast. Thereby, operating a key indicated with the mark M1 enables the user to notify the program information with a simple operation while viewing the television broadcast.

Further, in this embodiment, when the notification request for the television program information being viewed in input, the mobile terminal firstly selects the person to be the candidates of the notification destinations on the basis of the keywords stored in the second storage area 241, then, determines whether or not the selected persons to be the candidates of the notification destinations satisfy the notification conditions on the basis of the presence information on the selected user, and transmits the e-mail including the program information to the user's terminal which satisfies the notification conditions.

Accordingly, the mobile terminal may select the person satisfying the notification destination in response to, for example, the category of the television broadcast being viewed, and further, may notify the program information only to the terminal of the person satisfying the notification conditions on the basis of the preset presence information in response to, for example, the schedule of the person and the operation state of the terminal.

Moreover, in the embodiment, when it is determines that the notification conditions of the person to be the notification destination candidate is not satisfied, and also the priority of the person is set as 'High', the mobile terminal stores the reception signal of the television broadcast being viewed in the first storage area 242. Thereby, even if a person is given priority, the program information is not notified to the person because the notification conditions are not satisfied, the mobile terminal records the reception signal of the television broadcast being viewed. Therefore, the mobile terminal may transfer the reception signal of the recorded television broadcast later to the person's terminal to which the program information has not been notified.

The present invention is not limited to the aforementioned embodiment. For instance, the mobile terminal may select the persons to be the candidates for the notification destinations by using group names G1 and G2 included in the information relating to the notification destination persons stored in the second storage area 241. For instance, a plurality of users to be the notification destinations are grouped into groups in a school, groups of clubs, private groups, etc., and the user selects and specifies the groups to be notified among the groups at the time of an input of a notification request. Thus, the mobile terminal may transmit the e-mail of the program information after the selecting the person belonging to the selected and specified by the person as the candidates of the notification destinations and checking the notification conditions on the basis of the presence information on the selected person as the notification destination candidates.

In creating the e-mail for notifying the program information, the mobile terminal may cut out a still image at arbitrary timing from the television broadcast during reception, and may attach the still image to the e-mail as a picture. Thereby, the user at the notification destination who has received the e-mail may immediately recognize the program name form the image attached to the e-mail.

Furthermore, in the embodiment, the program notification mark M1 is displayed in the PIC information display area 282. However, the mark M1 may be displayed at a part of the display area of the television broadcasting video by superposing it on the television broadcasting vide. After the completion of the notification of the program information, it is preferable for the mark M1 to be displayed by being changed into a notification completion mark M2. The mark M1 is displayed again after the television broadcast program is changed into another channel. However, if the channel has been changed into another channel once, and if the changed channel is returned again into the channel before changing to the notification of the program information has completed, the notification completion mark M2 is display as long as the program which has been broadcasted through the corresponding-channel is continuously broadcasted.

Moreover, in the embodiment, the program notification mark M1 is displayed during viewing of the program. However, if the keyword corresponding to the category of the television broadcast program being viewed is stored in the second storage are 241, the mobile terminal may display the mark M1. Thus, there is no need to perform useless processing when there is no partner to notify the program information.

Other than this, this invention may be embodied in various forms without departing from the spirit or scope of the general inventive concept thereof for the types and configurations of the mobile terminals, the kinds of the television broadcasts, the structures of the information and content of the presence information relating to the users to be the notification destinations, the selection control procedures and control contents of the notification destinations, notification control procedures and control contents of the program information, etc.

In short, it is our intention that the invention is not limited to the specific details and representative embodiments shown and described herein, and in an implementation phase, this invention may be embodied in various forms without departing from the spirit or scope of general inventive concept thereof. Various types of the invention can be formed by appropriately combining a plurality of constituent elements, for example, may be omitted may be omitted from the whole of the constituent elements shown in the embodiments mentioned above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal with a unit which performs information communication via a radio communication network and a unit which performs a reception and a display of a television broadcast signal, the mobile terminal comprising:
   a storage unit configured to store at least address information of other terminals to be notification destinations of program information related to the television broadcast, the storage unit also being configured to store keyword information indicating an attribute of the program information related to the television broadcast to be notified to the other terminals; and
   a control unit including:
      a first control module configured to generate notification data including the program information related to the television broadcast while maintaining the reception and the display processing of the television broadcast signal when a notification request for program information related to the television broadcast is received during the reception and the display of the television broadcast signal; and
      a second control module configured to read address information of other terminals to be the notification destinations from the storage unit and transmit the generated notification data to the other terminals on the basis of the read address information and the keyword information,
   wherein the storage unit stores presence information which sets information showing operation states of other terminals to be notification destinations and showing priorities of notification into schedules of the terminals; and the second control module includes:
   a first determining module configured to read the presence information associated with the selectively read address information as the notification destinations from the storage unit and determine the propriety of notifying the program information on the basis of the read presence information; and
   a module configured to transmit the notification data including the program information when the first determining module determines that it is possible to notify the program information and not to transmit the notification data including the program information program when the first determining module determines that it is impossible to notify the program information,
   wherein the storage unit stores first priority information showing priorities of notification preset by associating with types of operation states of other terminals to be notification destinations by including the first priority information in the presence information; and wherein the first determining module acquires information showing the types of the operation states of other terminals by communicating with other terminals on the basis of the address information of other terminals read from the storage unit and determines the priority of the notification of the program information on the basis of the acquired information showing the types of the operation states of other terminals and the first priority information stored in the storage unit.

2. The mobile terminal according to claim 1, wherein the storage unit associates the keyword information with the address information of other terminals to be notification destinations, and wherein the second control module comprises:

a second determining module configured to determine whether or not the keyword information showing the attribute of the program information related to the television broadcast being received is stored in the storage unit when the notification request for the program information is input; and a module configured to selectively read the address information associated with the keyword information and transmit the notification data including the program information related to the television broadcast on the basis of the read address information when the second determining module determines that the keyword information is stored in the storage unit.

3. The mobile terminal according to claim 1, wherein the storage unit stores information showing priority of notification, when other terminals to be notification destinations are outside a communication area, by including the information into the presence information as the first priority information; and the first determining module performs transmissions to other terminals on the basis of the address information of other terminals read from the storage unit to acquire information showing whether or not other terminals are outside a communication area and determines the priority of the notification of the program information on the basis of the first priority information stored in the storage unit when other terminals are outside the communication area.

4. The mobile terminal according to claim 1, wherein the storage unit stores information showing priority of notification, when other terminals to be notification destinations are in roaming, by including the information into the presence information as the first priority information; and the first determining module performs transmissions to other terminals on the basis of the address information of other terminals read from the storage unit to acquire information showing whether or not other terminals are in roaming and determines the priority of the notification of the program information on the basis of the first priority information stored in the storage unit when other terminals are in roaming.

5. The mobile terminal according to claim 1, wherein the storage unit stores information showing priority of notification, when other terminals to be notification destinations are in viewing the television broadcast, by including the information into the presence information as the first priority information; and the first determining module performs a transmission to other terminals on the basis of the address information of other terminals read from the storage unit to acquire information showing whether or not other terminals are in viewing the television broadcast and determines the priority of the notification of the program information on the basis of the first priority information stored in the storage unit when other terminals are in viewing the television broadcast.

6. Mobile terminal according claim 1, wherein the storage unit stores first priority information showing priorities of notification preset by associating with action schedules of users owing other terminals to be the notification destinations by including the second priority information in the presence information; and the first determining module determines the priority of the notification of the program information on the basis of a current time and the second priority information stored in the storage unit.

7. The mobile terminal according to claim 1, further comprising:

a television broadcast recording control module configured to record content of the television broadcast during the reception and the display when the first determining module determines that the notification of the program information is impossible.

8. The mobile terminal according to claim 7, wherein the storage unit stores information showing priorities of other terminals by associating with the address information of other terminals to be the notification destinations; and the television broadcast recording control module reads information showing the priorities corresponding to the address information of other terminals to be the notification destinations from the storage unit when the first determining module determines that the notification of the program information is impossible and records content of the television broadcast during the reception and the display when the read information showing the priorities is 'High'.

9. The mobile terminal according to claim 1, wherein the first control module cuts out still image data from the television broadcast signal being received and generate notification data including the cut out still image data.

10. The mobile terminal according to claim 1, further comprising:

a start control module configured to display software key information showing a notification function of the program information in an area displaying PICT information showing an operation state of the mobile terminal, and when the software key information is selected by an input operation from a user, to start the first and the second control modules.

11. A mobile terminal which can communicate with a base station of a radio communication network and can receive a television broadcast signal, the mobile terminal comprising:

a storage unit configured to store mail addresses and keyword information indicating attribution information regarding the television broadcast signal; and a control unit comprising:

a first detecting unit configured to detect attribution information corresponding to information included in the television broadcast signal being viewed;

a display control unit configured to display a symbol image if the detecting unit detects that the television broadcast signal includes the information corresponding to the keyword information indicating attribution information;

a second detecting unit configured to detect whether the instruction to transmit notification data including channel information corresponding to the television broadcast signal being viewed is input;

a control module configured to create a mail including a mail address corresponding to the detected attribution information stored in the storage unit and channel information corresponding to the television broadcast signal being viewed; and a transmitting unit configured to transmit the mail to the base station, wherein the storage unit stores presence information which sets information showing operation states of other terminals to be notification destinations and showing priorities of notification into schedules of the corresponding terminals; and the second detecting unit includes:

a first determining module configured to read the presence information associated with the selectively read address information as the notification destinations from the storage unit and determine the propriety of notifying the program information on the basis of the read presence information; and a module configured to transmit the notification data including the program information when the detecting module determines that it is possible to notify the program information and not to transmit the notification data including the program information program when the detecting module determines that it is impossible to notify the program information, wherein the storage unit stores first priority information showing priorities of notification preset by associating with types of operation states of other terminals to be notification destinations by including the first priority information in the presence information; and wherein the first determining module acquires information showing the types of the operation states of other terminals by communicating with other terminals on the basis of the address information of other terminals read from the storage unit and determines the priority of the notification of the program information on the basis of the acquired information showing the types of the operation states of other terminals and the first priority information stored in the storage unit.

12. The mobile terminal according to claim 11, wherein, the attribution information is category information of the television broadcast signal.

13. The mobile terminal according to claim 11, wherein
the storage unit further stores electronic program guide information; and
the first detecting unit detects the attribution information corresponding to information included in the television broadcast signal being viewed by comparing the attribution information and the electronic program guide information.

14. The mobile terminal unit of claim 1, wherein the least address information of other terminals to be notification destinations of program information related to the television broadcast comprise at least one selected from the group consisting of telephone numbers, mail addresses, user names, keywords, presence information and priorities of other terminals.

15. The mobile terminal of claim 11, wherein the control module configured to create a mail including a mail address corresponding to the detected attribution information stored in the storage unit and channel information corresponding to the television broadcast signal being viewed is performed as a background process while maintaining reception and display processing television broadcast signal.

* * * * *